US010168570B2

(12) United States Patent
Lin et al.

(10) Patent No.: US 10,168,570 B2
(45) Date of Patent: Jan. 1, 2019

(54) DISPLAY APPARATUS

(71) Applicant: Innolux Corporation, Miao-Li County (TW)

(72) Inventors: Li-Ming Lin, Miao-Li County (TW); Chih-Ming Liang, Miao-Li County (TW); Yi-Chun Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/700,241

(22) Filed: Sep. 11, 2017

(65) Prior Publication Data

US 2018/0088401 A1 Mar. 29, 2018

(30) Foreign Application Priority Data

Sep. 28, 2016 (CN) .......................... 2016 1 0857566

(51) Int. Cl.
| G09F 13/04 | (2006.01) |
| G02F 1/1335 | (2006.01) |
| F21V 1/00 | (2006.01) |
| G02F 1/23 | (2006.01) |
| G02F 1/01 | (2006.01) |

(52) U.S. Cl.
CPC .......... *G02F 1/133512* (2013.01); *F21V 1/00* (2013.01); *G02F 1/0107* (2013.01); *G02F 1/23* (2013.01)

(58) Field of Classification Search
CPC .... G02F 1/133512; G02F 1/0107; G02F 1/23; F21V 1/00
See application file for complete search history.

(56) References Cited

U.S. PATENT DOCUMENTS

| 2007/0181921 A1* | 8/2007 | Kim .................. G02F 1/133512 257/290 |
| 2007/0216832 A1* | 9/2007 | Takahashi ......... G02F 1/133516 349/106 |
| 2017/0176817 A1* | 6/2017 | Tseng ................ G02F 1/133345 |
| 2017/0255308 A1* | 9/2017 | Li ..................... G02F 1/133345 |

* cited by examiner

*Primary Examiner* — Evan Dzierzynski
(74) *Attorney, Agent, or Firm* — McClure, Qualey & Rodack, LLP

(57) ABSTRACT

A display apparatus includes a first substrate, a second substrate assembled to the first substrate, and several spacers disposed between the first substrate and the second substrate. The first substrate includes a first base plate and a first light-shielding layer disposed on the first base plate, wherein the first light-shielding layer includes several first light-shielding portions extending along a first direction. The second substrate includes a second base plate and a second light-shielding layer disposed on the second base plate, wherein the second light-shielding layer includes several second light-shielding portions extending along a second direction, and the second direction is different from the first direction.

18 Claims, 6 Drawing Sheets

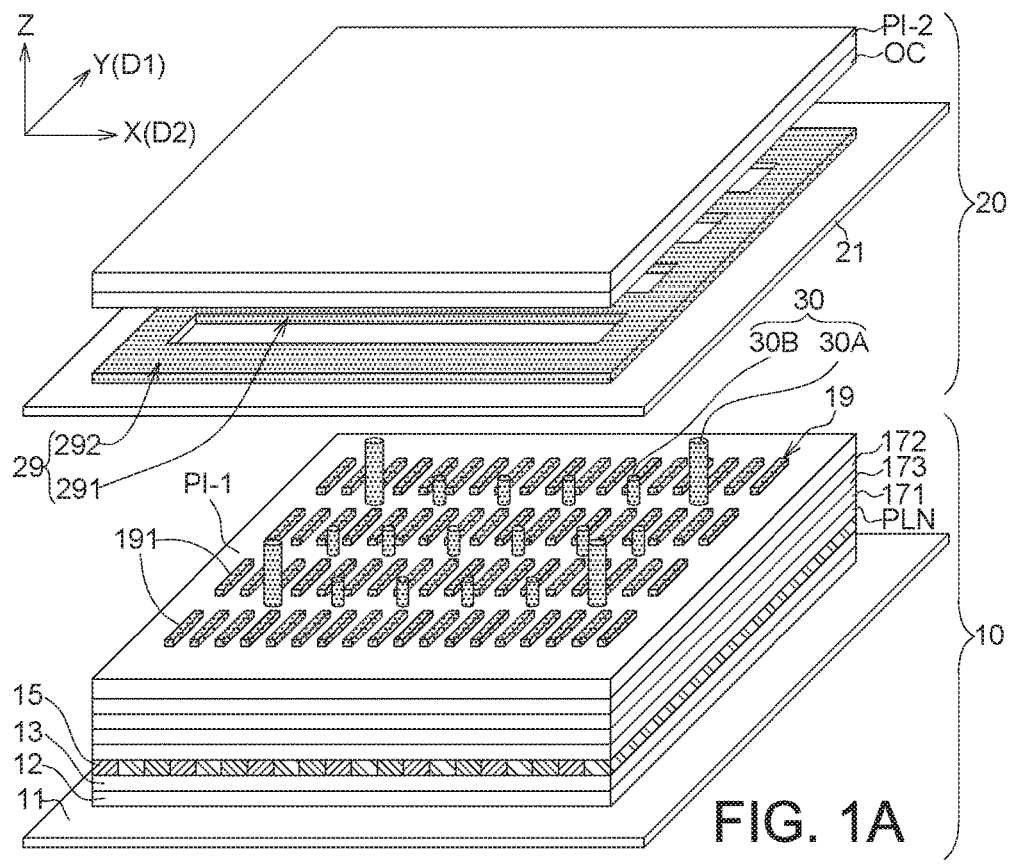
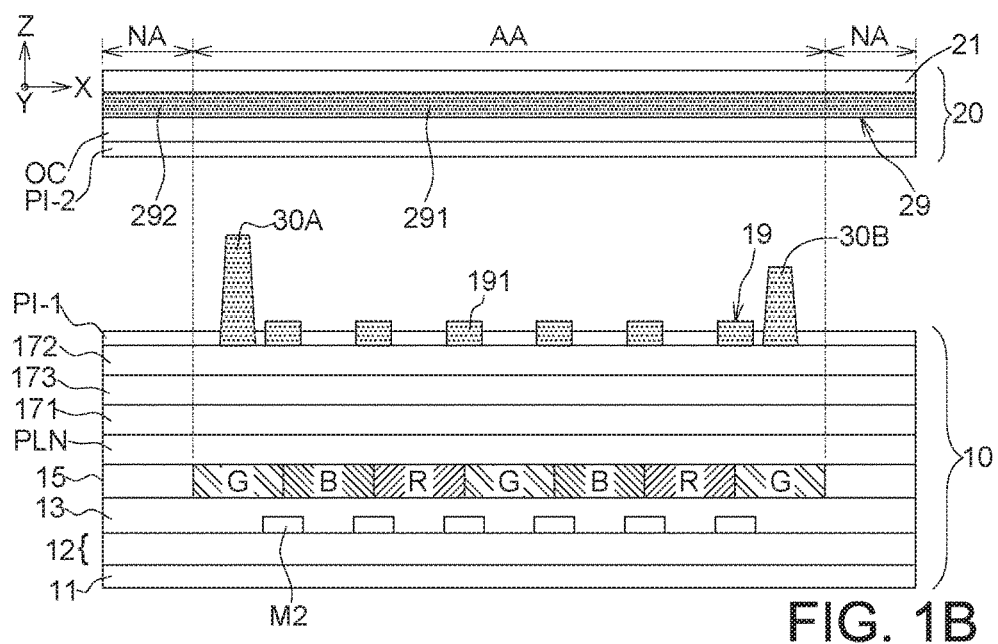
FIG. 1A
FIG. 1B

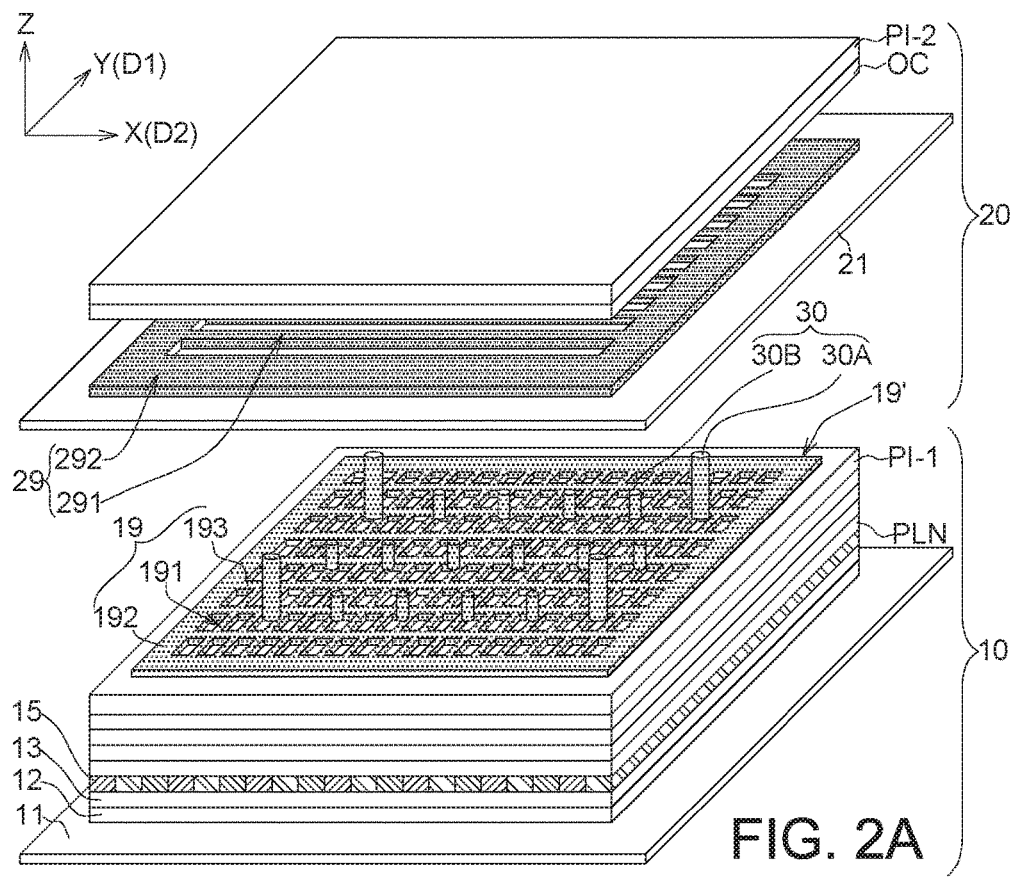
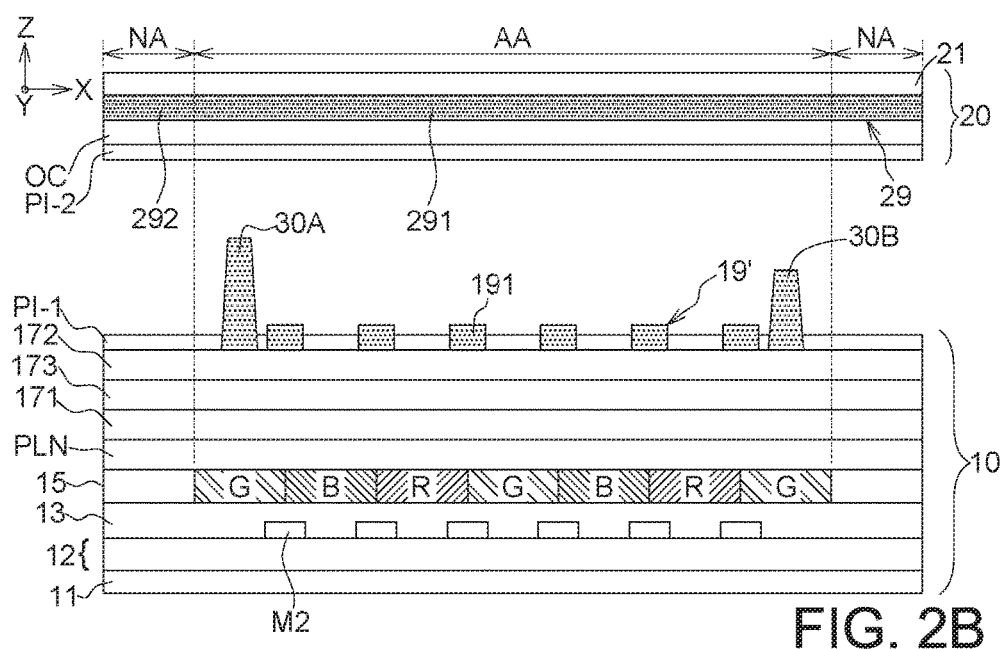

DISPLAY APPARATUS

This application claims the benefit of People's Republic of China application Serial No. 201610857566.5, filed Sep. 28, 2016, the subject matters of which are incorporated herein by references.

BACKGROUND

Technical Field

The disclosure relates in general to a display apparatus, and more particularly to a display apparatus with two light-shielding layers disposed on different substrates.

Description of the Related Art

Electronic products with display panel, such as smart phones, tablets, notebooks, monitors, and TVs, have become indispensable necessities to modern people no matter in their work, study or entertainment. With a flourishing development of the portable electronic products, the consumers have higher expects on the functions, the specifications and the prices of the products. The development of next-generation display focuses on the energy saving and environment-friendly techniques. Different displaying techniques have been well-developed. For example, liquid crystal display (LCD) has several advantages of lightweight, compactness, portability, low price and reliability, which has replaced the CRT monitors and becomes one of the most commonly-used displays in the electronic products.

A conventional thin-film transistor (TFT) display apparatus includes a color filter (CF) substrate and a TFT array substrate assembled to each other, wherein the CF substrate controls the optical properties of display, and the TFT array substrate controls the electrical properties of display. Whether what types of the displaying techniques or related components are adopted in the display apparatus, the important factors for manufacturing a qualified display apparatus includes not only the details in procedures such as accurate patterning steps (ex: lithography and etch) for manufacturing the conductive layers (ex: metal layers), the semiconductor layers and the light-shielding layers without breaking the related traces and patterns, but also the precise positions of the relative layers and pattern designs for meeting the electrical performance requirements of the product, thereby producing the display apparatus with good reliability. Take the light-shielding layer (such as black matrix) as example, the light-shielding layer typically suffers from the problem of undesirable residues on an organic or an inorganic layer due to the limitations of the applicable materials of the light-shielding layers and the processing machine currently in use, so that it is not easy to form a light-shielding layer with an accurate pattern, thereby affecting the production yield of the display apparatus.

SUMMARY

The disclosure is directed to a display apparatus, wherein a pattern of a light-shielding layer is divided into two parts and fabricated separately at different substrates.

According to one embodiment of the present disclosure, a display apparatus is provided, comprising a first substrate, a second substrate assembled to the first substrate, and a plurality of spacers disposed between the first substrate and the second substrate. The first substrate comprises a first base plate and a first light-shielding layer disposed on the first base plate, wherein the first light-shielding layer comprises a plurality of first light-shielding portions extending along a first direction. The second substrate comprises a second base plate and a second light-shielding layer disposed on the second base plate, wherein the second light-shielding layer comprises a plurality of second light-shielding portions extending along a second direction, and the second direction is different from the first direction.

The disclosure will become apparent from the following detailed description of the preferred but non-limiting embodiments. The following description is made with reference to the accompanying drawings.

BRIEF DESCRIPTION OF THE DRAWINGS

FIG. 1A is a simple drawing showing a perspective view of a display apparatus according to the first embodiment of the disclosure.

FIG. 1B is a cross-sectional view of a display apparatus according to the first embodiment of the disclosure.

FIG. 2A is a simple drawing showing a perspective view of a display apparatus according to the second embodiment of the disclosure.

FIG. 2B is a cross-sectional view of a display apparatus according to the second embodiment of the disclosure.

DETAILED DESCRIPTION

Figure 3A:
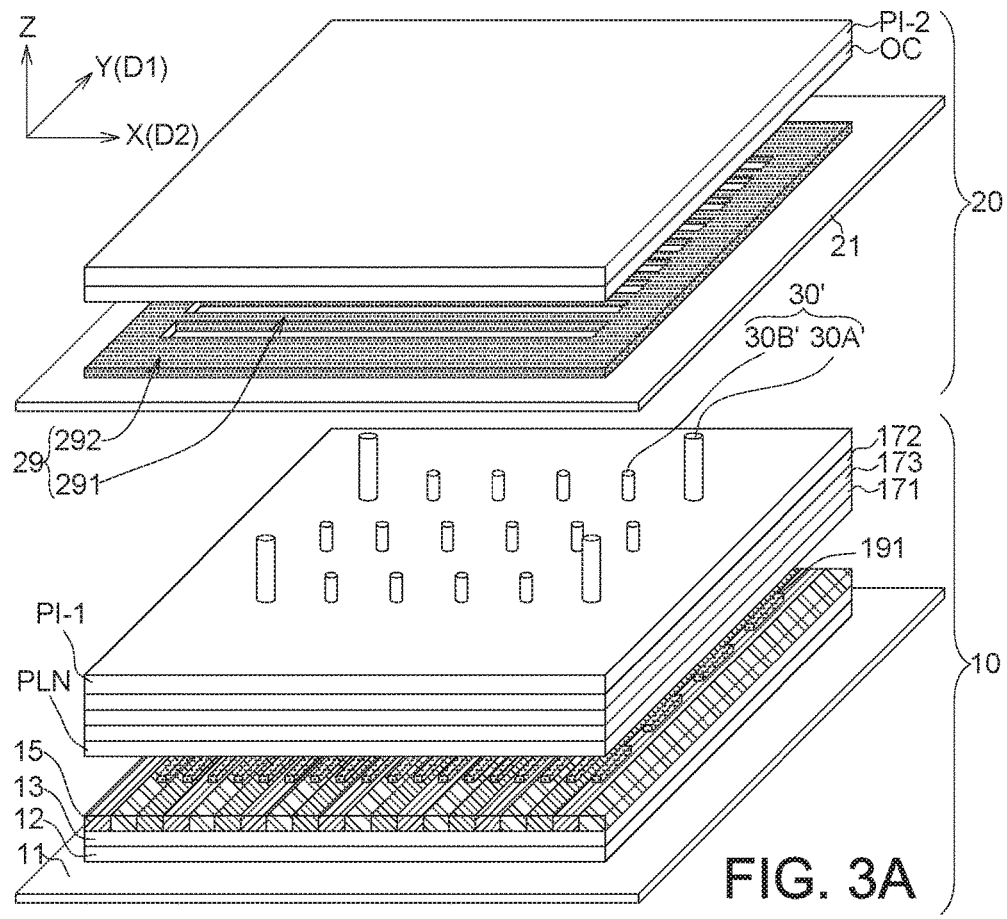
FIG. 3A is a simple drawing showing a perspective view of a display apparatus according to the third embodiment of the disclosure.

In the embodiments of the present disclosure, a pattern of a light-shielding layer can be divided into two parts and separately fabricated at different substrates of a display apparatus. In one embodiment, a light-shielding pattern corresponding to the data lines is constructed at an array substrate with a color resist layer for preventing color-shift of display image. A light-shielding pattern corresponding to the scan lines (including thin film transistors (TFTs)) and another frame light-shielding pattern corresponding to the non-displaying area are constructed at another substrate, thereby preventing the phenomenon of light leakage. According to the design of the embodied display apparatus, the problem of a conventional single light-shielding layer suffering from fabrication difficulty can be solved. Therefore, the embodied design of the present disclosure, which makes a breakthrough of the high precision requirement of light-shielding layer during fabrication, is very suitable for applying to a high resolution display apparatus, thereby forming an accurate pattern of the light-shielding portions in the applied display apparatus to meet the high accuracy requirement. Additionally, in one embodiment, two light-shielding materials with different optical density values can be chosen for forming the light-shielding patterns at different substrates, thereby preventing the residue issue (ex: the light-shielding material with less optical density value) after patterning procedures and/or achieving good shielding effect (ex: the light-shielding material with higher optical density value). Thus, the display apparatus applied with the embodied design has stable and advantageous display quality, and the embodied design is suitable for mass production.

The embodiments of the present disclosure can be applied to an array substrate of a display apparatus, wherein the array substrate has a color resist layer, and the switch devices on the substrate can be, but not limited to, the thin film transistors (TFTs). Examples of the applicable types of TFTs include the back channel etch type TFTs, the etch-stop type TFTs, the top-gate type TFTs, and the bottom-gate type TFTs. Also, the applicable materials of the semiconductor layers of the TFTs in the embodiment can be, but not limited to, amorphous silicon, polysilicon, metal oxides, or other suitable materials. The embodiments are described in details with reference to the accompanying drawings. It is noted that the details of the structures of the embodiments are provided for exemplification, and the described details of the embodiments are not intended to limit the present disclosure. It is noted that not all embodiments of the invention are shown. Modifications and variations can be made without departing from the spirit of the disclosure to meet the requirements of the practical applications. Thus, there may be other embodiments of the present disclosure which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense. Also, the identical and/or similar elements of the embodiments are designated with the same and/or similar reference numerals.

Moreover, use of ordinal terms such as "first", "second", "third", etc., in the specification and claims to modify an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

First Embodiment

FIG. 1A is a simple drawing showing a perspective view of a display apparatus according to the first embodiment of the disclosure. FIG. 1B is a cross-sectional view of a display apparatus according to the first embodiment of the disclosure. In order to show a light-shielding layer of an upper substrate (i.e. a second substrate) of the display apparatus of FIG. 1A, it is noted that the configurations of the upper substrates of FIG. 1A and FIG. 1B are presented reversely. A display apparatus of the first embodiment includes a first substrate 10, a second substrate 20 assembled to the first substrate 10, several spacers 30 disposed between the first substrate 10 and the second substrate 20, and a display medium layer (not shown, comprising liquid crystals, organic light emitting diodes or inorganic light emitting diodes, for example) disposed between the first substrate 10 and the second substrate 20. According to the heights of the spacers 30, the spacers 30 can be divided into the main-spacers 30A and the sub-spacers 30B, wherein the main-spacers 30A are higher than the sub-spacers 30B. The main-spacers 30A maintain a cell gap between the first substrate 10 and the second substrate 20, while the sub-spacers 30B function as buffers between the first substrate 10 and the second substrate 20. In one embodiment, the main-spacers 30A and the sub-spacers 30B are disposed on the first substrate 10. However, in another embodiment, the main-spacers 30A and the sub-spacers 30B are disposed on the second substrate 20. In another embodiment, the main-spacers 30A and the sub-spacers 30B are simultaneously disposed on the first substrate 10 and the second substrate 20. According to the embodiment, two light-shielding layers with different patterns are disposed on two different substrates.

In one embodiment, the first substrate 10 comprises a first base plate 11 and a first light-shielding layer 19 disposed on the first base plate 11. The first base plate 11 could be a rigid base plate or a flexible base plate. Material examples of the rigid base plate include glass and quartz, and material examples of the flexible base plate include ultra-thin glass and plastic such as polyimide (PI) or polyethylene terephthalate (PET), but the disclosure is not limited thereto. The first light-shielding layer 19 comprises several first light-shielding portions 191 extending along a first direction D1 (such as Y-direction). In one embodiment, the first light-shielding portions 191 are extended substantially along the first direction D1. In another embodiment, the plurality of first light-shielding portions 191 are arranged at the first direction D1 in the zigzag way, but each of the first light-shielding portions 191 are extended along a direction having an angle deviation with respect to the first direction D1. As shown in FIG. 1A, the first light-shielding portions 191 are arranged non-continuously along the first direction D1, such as four separated first light-shielding portions 191 as depicted. In another embodiment, the first light-shielding portions 191 can be arranged continuously along the first direction D1, such as four connecting first light-shielding portions 191.

The second substrate 20 comprises a second base plate 21 and a second light-shielding layer 29 disposed on the second base plate 21. The second base plate 21 could be a rigid base plate or a flexible base plate. Material examples of the rigid base plate include glass and quartz, and material examples of the flexible base plate include ultra-thin glass and plastic such as polyimide (PI) or polyethylene terephthalate (PET), but this embodiment is not limited thereto. The second light-shielding layer 29 comprises several second light-shielding portions 291 extending along a second direction D2 (such as X-direction). In one embodiment, the second light-shielding portions 291 are extended substantially along the second direction D2, wherein the second direction D2 is different from the first direction D1, and an angle exists between the second direction D2 and the first direction D1, such as an angle of 90 degrees (i.e. the second direction D2 is perpendicular to the first direction D1), an acute angle or an obtuse angle (i.e. the second direction D2 is not perpendicular to the first direction D1). As shown in FIG. 1A, the second light-shielding portions 291 are arranged continuously along the second direction D2, such as the second light-shielding portions 291 in the form of stripes. However, in another embodiment, the second light-shielding portions 291 are arranged non-continuously along the second direction D2, such as separated second light-shielding portions 291. Additionally, in this embodiment, the second light-shielding portions 291 are corresponding to positions of the spacers 30 (including at least one of main-spacers 30A and at least one of sub-spacers 30B) after assembly of the substrates. In other embodiments, the second light-shielding portions 291 are not corresponding to positions of the spacers 30.

Also, in the embodiment, the light-shielding materials with different optical density values can be adopted for fabricating two light-shielding layers on different substrates. That is, the first light-shielding layer 19 has a first optical density (OD) value, the second light-shielding layer 29 has a second optical density value, and the first optical density value is different from the second optical density value for meeting different light-shielding requirements of the substrates. The light-shielding material with higher optical density value would have better light-shielding effect, but it suffers from the residual issue during patterning process. In one embodiment, a light-shielding material with higher optical density value is selected for forming the second light-shielding layer 29 (ex: corresponding to the scan lines and TFTs) of the second substrate 20 to achieve better light-shielding effect. A light-shielding material with less optical density value is selected for forming the first light-shielding layer 19 of the first substrate 10, wherein the residues remained in the patterning process can be prevented by adopting the light-shielding material with lower carbon content (i.e. the first optical density value is less than the second optical density value). This design of the embodiment not only solves the conventional residue issue which leads to unsuccessful formation of fine patterns, but also achieves good light-shielding effect. Thus, the display apparatus applied with the design of the embodiment has stable and advantageous display quality, and the design of the embodiment is suitable for mass production. In one embodiment, the second optical density value of the second light-shielding layer 29 is in a range of 3 to 6, and the first optical density value of the first light-shielding layer 19 is in a range of 1 to 3; for example, the first optical density value is less than or equal to half of the second optical density value. The first and second optical density values described herein are referred to the optical density values of the final thicknesses of the films of the first light-shielding layer 19 and the second light-shielding layer 29, respectively (i.e. OD=–Log (Transmittance)). Additionally, an optical density of the selected material layer can be determined by a photometer. For example, a transmittance of other positions excluding the selected material layer is determined as a reference value, and a transmittance of the position including the selected material layer is determined as a measured value. Dividing the measured value by the reference value is the transmittance of the selected material layer, and an optical density of the selected material layer can be calculated from the transmittance of the selected material layer subsequently. Noted that the method as described above is not disclosed for limiting the present disclosure (the related measurement procedures are conducted according to the standard process known to the skilled person, and the details are not redundantly described herein).

The disclosure can be applied to an array substrate with color resist layers. In one embodiment, the first substrate 10 is an array substrate, and comprises a displaying area AA and a non-displaying area NA outside the displaying area AA, wherein the first light-shielding portions 191 and the second light-shielding portions 291 of different substrates are disposed correspondingly to the displaying area AA. The displaying area AA of the first substrate 10 comprises several data lines (ex: the second metal layer M2 in FIG. 1B) intersected with several scan lines. Also, the first light-shielding portions 191 of the embodiment are disposed correspondingly to the data lines (ex: the second metal layer M2), and the second light-shielding portions 291 are disposed correspondingly to the scan lines for shielding the scan lines.

In the fabrication of an array substrate, besides the data lines intersected with the scan lines for defining several pixel regions, the array substrate further comprises other devices related to the pixel regions, such as TFTs and pixel electrodes. In this embodiment, a second metal layer M2 in FIG. 1B denotes the data lines, and a TFT layer 12 in FIG. 1B denotes a first metal layer and thin film transistors. Also, the stacked relationship of each layer in the display area AA is depicted in FIG. 1B. In one embodiment, the first substrate 10 further comprises a passivation layer 13 disposed on the TFT layer 12 and covering the second metal layer M2. Also, in one embodiment, the first substrate 10 further comprises a color resist layer 15 disposed on the passivation layer 13, a planarization layer PLN disposed on the color resist layer 15, a first electrode 171 and a second electrode 172 (ex: made of conductive material such as indium tin oxide (ITO)) disposed on the planarization layer PLN, and an insulating layer 173 (with contact holes) disposed between the first electrode 171 and the second electrode 172, and a first alignment film PI-1 disposed on the second electrode 172. In one embodiment, the spacers 30 are disposed on the second electrode 172, and covered by the first alignment film PI-1 (since the alignment film has only a small amount or a nearly unobservable residual remained on the spacers 30, the alignment film on the surfaces of the spacers 30 is omitted from the drawing). Additionally, the color resist layer 15 of the embodiment is disposed correspondingly to the displaying area AA of the array substrate, and includes (but not limited to) the red color resist R, the blue color resist B and the green color resist G. In another embodiment, the color resist layer 15 can be disposed correspondingly to a non-displaying area NA of an array substrate.

In the first embodiment, the spacers 30 and the first light-shielding layer 19 above the first base plate 11 can be made of the same material and fabricated in the same processing step; thus, the spacers 30 and the first light-shielding layer 19 of the first embodiment may have the same optical density (OD) value. However, in another embodiment, the spacers 30 and the first light-shielding layer 19 can be made of different materials and fabricated in different processing steps; in this case, the spacers 30 and the first light-shielding layer 19 have different optical density (OD) values. Also, in one embodiment, the spacers 30 and the first light-shielding layer 19 are disposed on the second electrode 172 (FIG. 1B), followed by forming the first alignment film PI-1.

Also, in one embodiment, the second substrate 20 further comprises an optical coating layer OC covering the second light-shielding layer 29, and a second alignment film PI-2 disposed on the optical coating layer OC. In one embodiment, the second alignment film PI-2 further comprises a frame shielding portion 292 disposed correspondingly to the non-displaying area NA. As shown in FIG. 1A, the frame shielding portion 292 has a frame pattern and surrounds the displaying area AA, wherein two ends of the second light-shielding portions 291 (ex: for shielding the scan lines) connect the frame shielding portion 292. Practically, the frame shielding portion 292 and the second light-shielding portions 291 are fabricated simultaneously, wherein the frame shielding portion 292 is able to reduce the light leaking from the non-displaying area NA. In another embodiment, it is also applicable that the frame shielding portion 292 and the second light-shielding portions 291 are not fabricated simultaneously.

The foregoing components are merely provided for illustrating one applicable configuration of the substrate components of the display apparatus, and the substrate structure may contain other components and/or layers. The substrate structure can be modified or varied to meet the requirements of the application products. The present disclosure is not limited to the components and/or layers described in the exemplified embodiment.

Second Embodiment

FIG. 2A is a simple drawing showing a perspective view of a display apparatus according to the second embodiment of the disclosure. FIG. 2B is a cross-sectional view of a display apparatus according to the second embodiment of the disclosure. Similarly, in order to show a light-shielding layer of an upper substrate (i.e. a second substrate) of the display apparatus, it is noted that the configurations of the upper substrates in the figures labeled with "A" (such as FIG. 2A-FIG. 5A) and "B" (such as FIG. 2B-FIG. 5B) are presented reversely. A display apparatus of the second embodiment also includes a first substrate 10, a second substrate 20 assembled to the first substrate 10, several spacers 30 (including the main-spacers 30A and the sub-spacers 30B) disposed between the first substrate 10 and the second substrate 20, and a display medium layer (not shown, comprising liquid crystals, organic light emitting diodes or inorganic light emitting diodes, for example) disposed between the first substrate 10 and the second substrate 20. The identical and/or similar elements of the second embodiment (FIG. 2A and FIG. 2B) and the first embodiment (FIG. 1A and FIG. 1B) are designated with the same and/or similar reference numerals for clear illustration. Please refer to the related contents of the first embodiment for the related layers and components of the second embodiment, and the details are not redundantly repeated hereinafter.

According to the second embodiment, the first light-shielding layer 19' and the second light-shielding layer 29 with different patterns are disposed on two different substrates. In the second embodiment, the first light-shielding layer 19' further comprises a plurality of third light-shielding portions 193 extending along the second direction D2 (i.e. X-direction), wherein the third light-shielding portions 193 and the first light-shielding portions 191 intersect and connect to each other, such as forming an angle of 90 degrees (i.e. the third light-shielding portions 193 is perpendicular to the first light-shielding portions 191), forming an acute angle or an obtuse angle (i.e. the third light-shielding portions 193 is not perpendicular to the first light-shielding portions 191). In the second embodiment, the optical density value of the first light-shielding layer 19' is lower than the optical density value of the second light-shielding layer 29 (i.e. the optical density value of the third light-shielding layer 193 is less than the optical density value of the second light-shielding layer 29). Also, the first light-shielding portions 191 of the first light-shielding layer 19' are disposed correspondingly to the data lines (ex: the second metal layer M2) for shielding the data lines, and the third light-shielding portions 193 are disposed correspondingly to the scan lines for shielding the scan lines.

Additionally, the first light-shielding layer 19' further comprises another frame shielding portion 192 surrounding the displaying area AA, wherein the first light-shielding portions 191 and the third light-shielding portions 193 connect the frame shielding portion 192. Since the first light-shielding layer 19' is made of the material with less optical density value, the conventional residue issue during patterning procedures for forming the first light-shielding portions 191, the frame shielding portion 192 and the third light-shielding portions 193 can be prevented.

Moreover, in the second embodiment, the spacers 30 and the first light-shielding layer 19' (including the first light-shielding portions 191, the frame shielding portion 192 and the third light-shielding portions 193) above the first base plate 11 can be made of the same material and fabricated in the same processing step. In another embodiment, the spacers 30 and the first light-shielding layer 19' are made of different materials and/or fabricated in different processing steps.

Third Embodiment

Figure 3B:
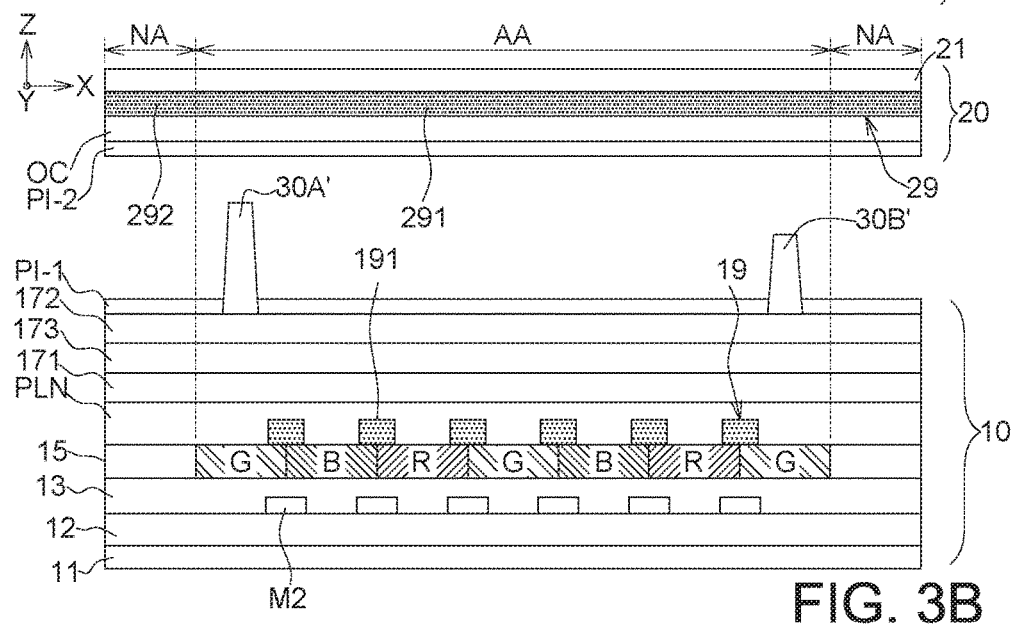
FIG. 3B is a cross-sectional view of a display apparatus according to the third embodiment of the disclosure.

FIG. 3A is a simple drawing showing a perspective view of a display apparatus according to the third embodiment of the disclosure. FIG. 3B is a cross-sectional view of a display apparatus according to the third embodiment of the disclosure. A display apparatus of the third embodiment also includes a first substrate 10, a second substrate 20 assembled to the first substrate 10, several spacers 30' (including the main-spacers 30A' and the sub-spacers 30B') disposed between the first substrate 10 and the second substrate 20, and a display medium layer (not shown, comprising liquid crystals, organic light emitting diodes or inorganic light emitting diodes, for example) disposed between the first substrate 10 and the second substrate 20. The identical and/or similar elements of the third embodiment (FIG. 3A and FIG. 3B) and the first embodiment (FIG. 1A and FIG. 1B) are designated with the same and/or similar reference numerals for clear illustration. Please refer to the related contents of the first embodiment for the related layers and components of the third embodiment, and the details are not redundantly repeated hereinafter.

According to the third embodiment, the first light-shielding layer 19 (i.e. the first light-shielding portions 191 disposed on the color resist layer 15 and disposed correspondingly to the data lines) and the second light-shielding layer 29 (i.e. the second light-shielding portions 291 disposed correspondingly to the scan lines, and the frame shielding portion 292 for shielding the area outside the displaying area AA) with different patterns are disposed on different substrates. Different from the configuration of the first embodiment, the spacers 30' (ex: made of the general materials of photo spacers) and the first light-shielding layer 19 of the third embodiment are fabricated in different processing steps, and the first light-shielding layer 19 (including the first light-shielding portions 191) is formed after forming the color resist layer 15. As shown in FIG. 3A and FIG. 3B, the first light-shielding layer 19 is disposed on the color resist layer 15, and the planarization layer PLN covers the first light-shielding layer 19 and the color resist layer 15.

Fourth Embodiment

Figure 4A:
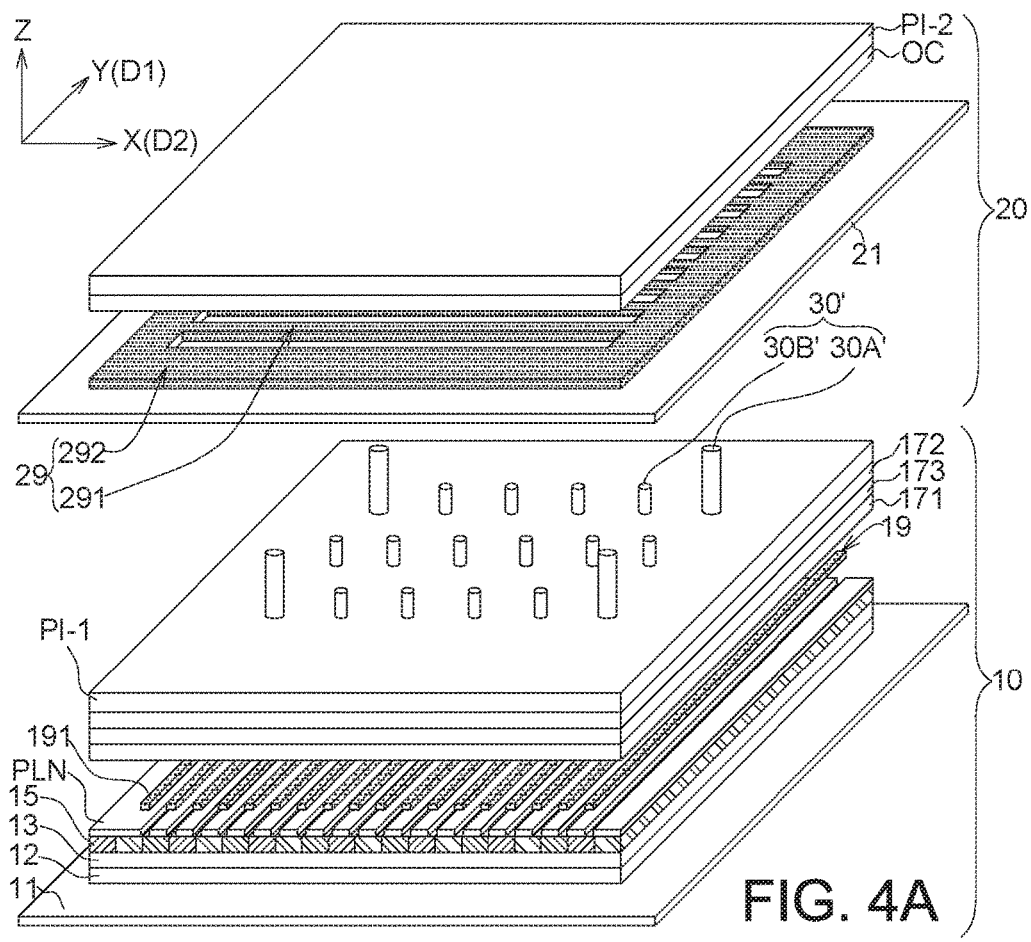
FIG. 4A is a simple drawing showing a perspective view of a display apparatus according to the fourth embodiment of the disclosure.
Figure 4B:
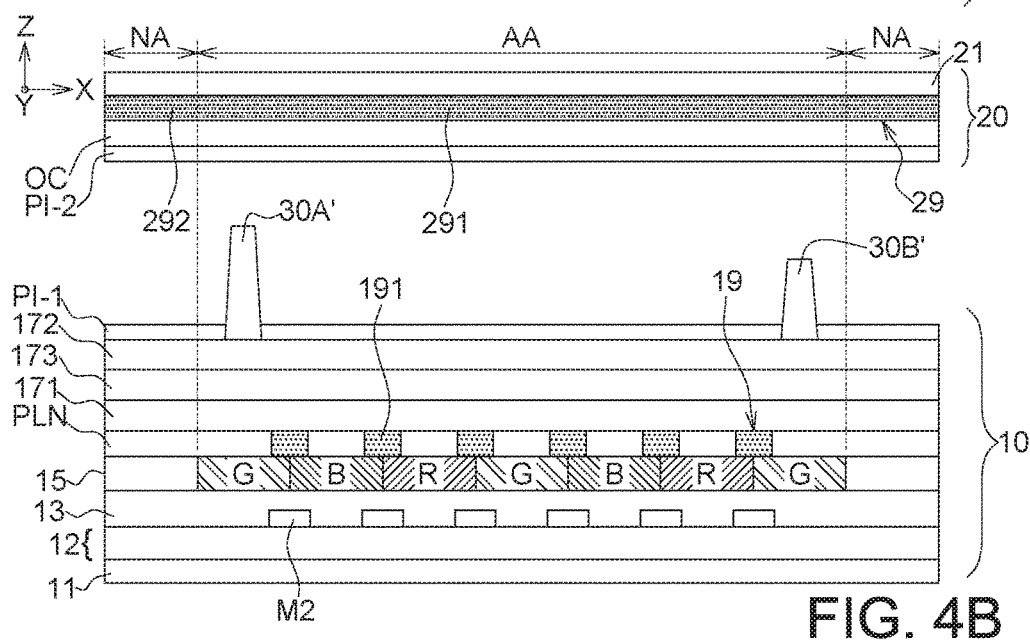
FIG. 4B is a cross-sectional view of a display apparatus according to the fourth embodiment of the disclosure.

FIG. 4A is a simple drawing showing a perspective view of a display apparatus according to the fourth embodiment of the disclosure. FIG. 4B is a cross-sectional view of a display apparatus according to the fourth embodiment of the disclosure. A display apparatus of the fourth embodiment also includes a first substrate 10, a second substrate 20 assembled to the first substrate 10, several spacers 30' (including the main-spacers 30A' and the sub-spacers 30B') disposed between the first substrate 10 and the second substrate 20, and a display medium layer (not shown, comprising liquid crystals, organic light emitting diodes or inorganic light emitting diodes, for example) disposed between the first substrate 10 and the second substrate 20. The identical and/or similar elements of the fourth embodiment (FIG. 4A and FIG. 4B) and the first embodiment (FIG. 1A and FIG. 1B) are designated with the same and/or similar reference numerals for clear illustration. Please refer to the related contents of the first embodiment for the related layers and components of the fourth embodiment, and the details are not redundantly repeated hereinafter.

According to the fourth embodiment, the first light-shielding layer 19 and the second light-shielding layer 29 with different patterns are also disposed on different substrates. In the fourth embodiment, the spacers 30' and the first light-shielding layer 19 are fabricated in different processing steps, which is identical to the third embodiment. Different from the configuration of the third embodiment, the first light-shielding layer 19 of the fourth embodiment is formed after forming the color resist layer 15 and the planarization layer PLN, wherein the planarization layer PLN is a patterned planarization layer having trenches positioned correspondingly to the data lines. The first light-shielding layer 19 would be formed by fills a selected light-shielding material into those trenches. Thus, the trench pattern of the planarization layer PLN determines the positions of the first light-shielding portions 191, thereby forming an accurate pattern of the first light-shielding portions 191 as required. Noted that it is not necessary to fully fill the trenches with the selected light-shielding material, it is also applicable to partially fill the trenches with the selected light-shielding material.

Fifth Embodiment

Figure 5A:
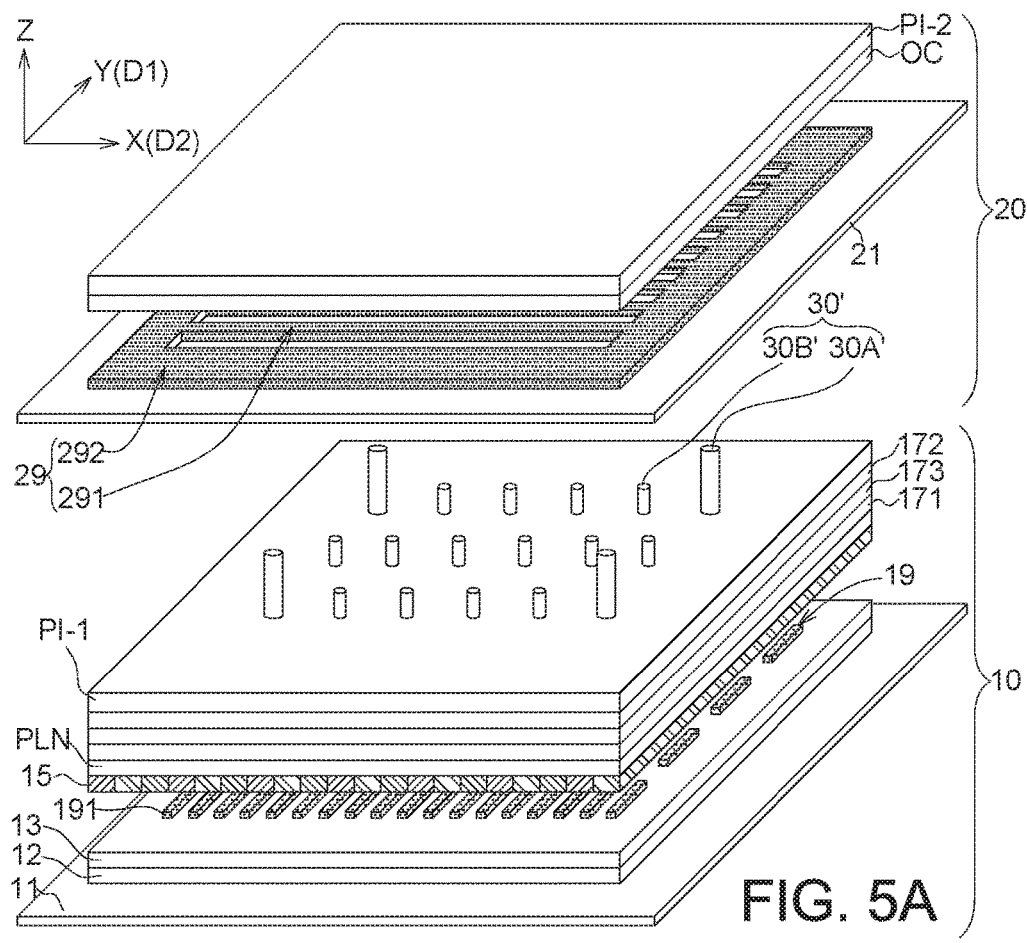
FIG. 5A is a simple drawing showing a perspective view of a display apparatus according to the fifth embodiment of the disclosure.
Figure 5B:
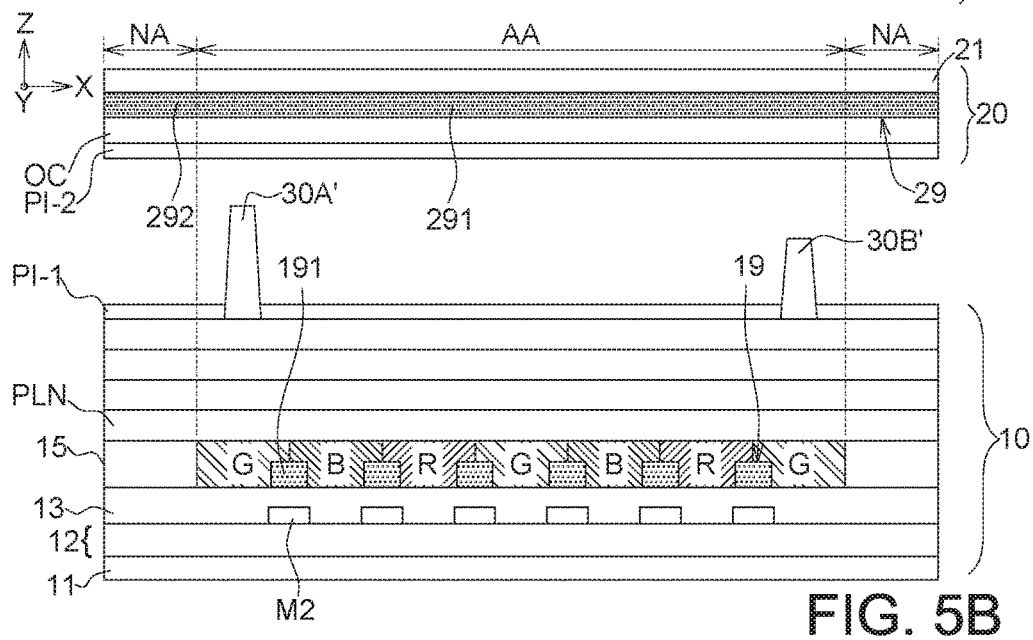
FIG. 5B is a cross-sectional view of a display apparatus according to the fifth embodiment of the disclosure.

FIG. 5A is a simple drawing showing a perspective view of a display apparatus according to the fifth embodiment of the disclosure. FIG. 5B is a cross-sectional view of a display apparatus according to the fifth embodiment of the disclosure. A display apparatus of the fifth embodiment also includes a first substrate 10, a second substrate 20 assembled to the first substrate 10, several spacers 30' (including the main-spacers 30A' and the sub-spacers 30B') disposed between the first substrate 10 and the second substrate 20, and a display medium layer (not shown, comprising liquid crystals, organic light emitting diodes or inorganic light emitting diodes, for example) disposed between the first substrate 10 and the second substrate 20. The identical and/or similar elements of the fifth embodiment (FIG. 5A and FIG. 5B) and the first embodiment (FIG. 1A and FIG. 1B) are designated with the same and/or similar reference numerals for clear illustration. Please refer to the related contents of the first embodiment for the related layers and components of the fifth embodiment, and the details are not redundantly repeated hereinafter.

According to the fifth embodiment, the first light-shielding layer 19 and the second light-shielding layer 29 with different patterns are also disposed on different substrates. In the fifth embodiment, the spacers 30' and the first light-shielding layer 19 are fabricated in different processing steps, which is identical to the third and fourth embodiments. Different from the configurations of the third and fourth embodiments, the first light-shielding layer 19 of the fifth embodiment is formed before forming the color resist layer 15. As shown in FIG. 5B, the first light-shielding layer 19 is disposed on the passivation layer 13 and disposed correspondingly to the data lines. The color resist layer 15 is formed after forming the first light-shielding layer 19.

According to the aforementioned embodiments, there are color resist layers 15 under the main-spacers 30A/30A' and the sub-spacers 30B/30B'. However, the disclosure is not limited thereto. In another embodiment, no color resist layer 15 exists under the main-spacers 30A/30A' and the sub-spacers 30B/30B'.

Figure 6:
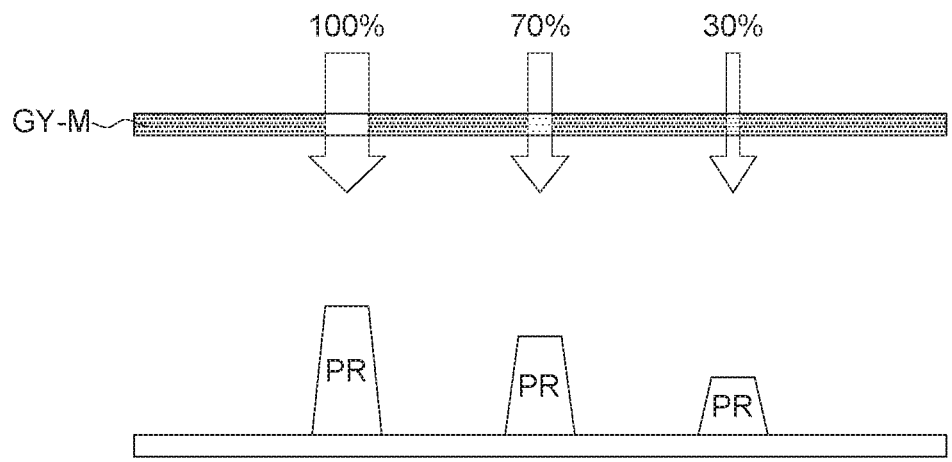
FIG. 6 shows photoresists with different thicknesses formed by a single mask.

FIG. 6 shows photoresists with different thicknesses formed by a single mask. In the applications of the present disclosure, a selected material (such as negative photoresist) can be exposed by using a gray-tone mask GY-M having several gray-tone regions with different light transmittances. After exposure, the molecular bonds of the exposed portions of the material are cross-linked. After development, the cross-linked portions (i.e. the exposed portions) are remained, and the unexposed portions are dissolved. The larger amount of the light received the greater thickness/height of the photoresist. As shown in FIG. 6, a portion of the photoresist corresponding to a region of the gray-tone mask GY-M with 100% of light transmittance has the greatest height among all of the portions, followed by the portion of the photoresist corresponding to the region of the gray-tone mask GY-M with 70% of light transmittance, and the portion of the photoresist corresponding to the region of the gray-tone mask GY-M with 30% of light transmittance has the lowest height. Accordingly, in application of the first and second embodiments, the heights of the to-be-formed objects can be controlled by the amounts of light received through a single gray-tone mask having several gray-tone regions with different light transmittances. For example, the light transmittance of the exposed regions of the gray-tone mask corresponding to the spacers 30 (having greater height, FIG. 1A-FIG. 2B) is larger than the light transmittance of the exposed regions of the gray-tone mask corresponding to the first light-shielding layer 19.

Figure 7:
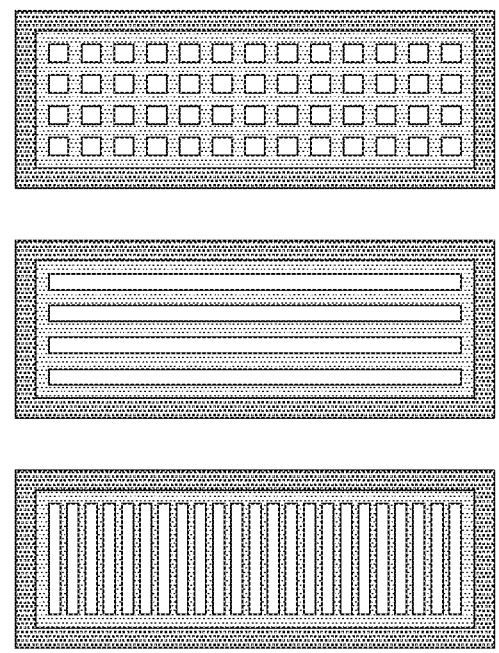
FIG. 7 shows three gray-tone masks with different patterns.

FIG. 7 shows three gray-tone masks with different patterns. During application for forming the first light-shielding layer 19/19' and the second light-shielding layer 29 of the embodiments, the pattern of the gray-tone masks can be determined or modified based on the required pattern of the to-be-formed objects. Those patterns of the gray-tone masks in FIG. 7 are merely provided for exemplification, not for limitation.

According to the display apparatus of the embodiment in aforementioned description, a pattern of a convention light-shielding layer (ex: black matrix) can be divided into two parts, and fabricated separately for disposing on different substrates. In one embodiment, the pattern of the first light-shielding layer 19/19' disposed on an array substrate (ex: the first substrate 10) is corresponding to the data lines, and the pattern of the second light-shielding layer 29 disposed on another substrate (ex: the second substrate 20) is corresponding to the scan lines (ex: the second light-shielding portions 291) and the area outside the displaying area AA (ex: the frame shielding portion 292), thereby preventing the phenomenon of light leakage and improving the contrast of the display image. In application of the array substrate having a color resist layer, the first light-shielding layer 19/19' is positioned adjacent to the color resist layer, so that the color-shift of the display image would be avoided. According to the design of the embodied display apparatus, the problem of a conventional single light-shielding layer suffering from fabrication difficulty can be solved. Therefore, the embodied design of the present disclosure, which makes a breakthrough of the resolution of light-shielding layer during fabrication, is very suitable for applying to a high resolution display apparatus, thereby forming an accurate pattern of the light-shielding portions in the applied display apparatus to meet the high accuracy requirement. Consequently, the production yield can be improved. Moreover, since the first light-shielding layer 19/19' of the embodiment is disposed closer to the data lines (i.e. the second metal layer M2) than a single light-shielding layer in the conventional display apparatus, it has better shielding precision; consequently, the embodied design of the present disclosure is also suitable in the application of curved display apparatus. Additionally, in one embodiment, two light-shielding materials with different optical density values can be chosen for forming the light-shielding patterns at different substrates; for example, the first light-shielding layer 19/19' at the array substrate (ex: the first substrate 10) is made of the material with less optical density value for preventing the residue issue after patterning procedures, and the second light-shielding layer 29 is made of the material with high optical density value for achieving good shielding effect. Therefore, the embodied display apparatus has not only the light shielding layers with patterns of high accuracy, but also increased production yield. Thus, the display apparatus applied with the design of the embodiment has stable and advantageous display quality, and the design of the embodiment is suitable for mass production.

Structural details of the aforementioned embodiments are provided for exemplification only, not for limitation. Other embodiments with different configurations, such as change on components of the switch devices and the displaying units and change on positions of the related layers and traces to meet practical requirements can be applicable. It is known by people skilled in the art that the configurations and the procedure details of the related components/layers could be adjusted according to the requirements and/or manufacturing steps of the practical applications.

In the aforementioned embodiments, the technique features described in one embodiment are not limited to the application of that embodiment. It is, of course, noted that the features of different embodiments can be combined and rearranged without departing from the spirit and scope of the present disclosure.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus, comprising:
   a first substrate, comprising a first base plate and a first light-shielding layer disposed on the first base plate, wherein the first light-shielding layer comprises a plurality of first light-shielding portions extending along a first direction;
   a second substrate, assembled to the first substrate, and the second substrate comprising a second base plate and a second light-shielding layer disposed on the second base plate, wherein the second light-shielding layer comprises a plurality of second light-shielding portions extending along a second direction, and the second direction is different from the first direction; and
   a plurality of spacers, disposed between the first substrate and the second substrate.

2. The display apparatus according to claim 1, wherein the first light-shielding layer has a first optical density value, the second light-shielding layer has a second optical density value, and the first optical density value is different from the second optical density value.

3. The display apparatus according to claim 2, wherein the first optical density value is less than the second optical density value.

4. The display apparatus according to claim 1, wherein the plurality of first light-shielding portions are arranged continuously along the first direction.

5. The display apparatus according to claim 1, wherein the plurality of first light-shielding portions are arranged non-continuously along the first direction.

6. The display apparatus according to claim 1, wherein the plurality of first light-shielding portions are arranged at the first direction in a zigzag way.

7. The display apparatus according to claim 1, wherein the plurality of second light-shielding portions are arranged continuously along the second direction.

8. The display apparatus according to claim 1, wherein the plurality of second light-shielding portions are arranged non-continuously along the second direction.

9. The display apparatus according to claim 1, wherein at least one of the plurality of second light-shielding portions is disposed correspondingly to one of the plurality of spacers.

10. The display apparatus according to claim 1, wherein the first substrate is an array substrate, and the first substrate comprises a displaying area and a non-displaying area outside the displaying area, wherein the displaying area comprises data lines intersected with scan lines, the plurality of first light-shielding portions are disposed correspondingly to the data lines, and the plurality of second light-shielding portions are disposed correspondingly to the scan lines.

11. The display apparatus according to claim 10, wherein the second light-shielding layer further comprises a frame light-shielding portion disposed correspondingly to the non-displaying area, and ends of the plurality of second light-shielding portions connect the frame light-shielding portion.

12. The display apparatus according to claim 1, wherein the first light-shielding layer further comprises a plurality of third light-shielding portions extending along the second direction, wherein the plurality of third light-shielding portions and the plurality of first light-shielding portions intersect and connect to each other.

13. The display apparatus according to claim 1, wherein the first substrate further comprises:
   a first metal layer and a second metal layer intersected to each other and disposed on the first base plate;
   a passivation layer, disposed on the first metal layer and the second metal layer;
   a color resist layer, disposed on the passivation layer;
   a planarization layer, disposed on the color resist layer;
   a first electrode and a second electrode, disposed on the planarization layer; and
   a first alignment film, disposed on the first electrode and the second electrode,
   wherein the plurality of spacers are disposed on the second electrode, and the first alignment film at least partially covers the plurality of spacers.

14. The display apparatus according to claim 13, wherein the plurality of spacers comprise a main-spacer and a sub-spacer, and a thickness of the main spacer is different from a thickness of the sub-spacer.

15. The display apparatus according to claim 14, wherein the thickness of the main spacer is higher than the thickness of the sub-spacer.

16. The display apparatus according to claim 13, wherein the first light-shielding layer is disposed on the color resist layer, and the planarization layer covers the first light-shielding layer.

17. The display apparatus according to claim 13, wherein the planarization layer has trenches, and the first light-shielding layer fills the trenches.

18. The display apparatus according to claim 13, wherein the first light-shielding layer is disposed on the passivation layer, and the color resist layer is disposed on the light-shielding layer.

* * * * *